(12) United States Patent
Pozzi et al.

(10) Patent No.: US 10,370,107 B2
(45) Date of Patent: *Aug. 6, 2019

(54) ARCED RAIL FOR AIRCRAFT TRAY TABLE

(71) Applicant: B/E Aerospace, Inc., Winston-Salem, NC (US)

(72) Inventors: Alexander N. Pozzi, Winston-Salem, NC (US); Mark W. Foohey, Austin, TX (US); Sam C. Scudder, Webberville, TX (US); John C. Horton, IV, Austin, TX (US); Steve K. Brown, Austin, TX (US); Darryl D. Daniel, Pflugerville, TX (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/939,431

(22) Filed: Mar. 29, 2018

(65) Prior Publication Data

US 2018/0281962 A1    Oct. 4, 2018

Related U.S. Application Data

(60) Provisional application No. 62/479,555, filed on Mar. 31, 2017.

(51) Int. Cl.
*B64D 11/06* (2006.01)
*B60N 3/00* (2006.01)

(52) U.S. Cl.
CPC .......... *B64D 11/0605* (2014.12); *B60N 3/002* (2013.01); *B64D 11/0638* (2014.12)

(58) Field of Classification Search
CPC ..... A47B 83/02; A47B 83/0215; A47B 83/00; B64D 11/0638; B60N 3/002
USPC ...... 108/103, 42, 22, 20; 297/128, 119, 120, 297/145, 149, 151, 160, 161, 162, 173; 248/277.1, 278.1
See application file for complete search history.

(56) References Cited

U.S. PATENT DOCUMENTS

| | | | | |
|---|---|---|---|---|
| 478,987 | A * | 7/1892 | Colby | A47B 83/02 |
| | | | | 297/142 |
| 1,196,050 | A * | 8/1916 | Watkins | A47C 7/70 |
| | | | | 297/162 |
| 1,779,827 | A * | 10/1930 | Reed | A47J 47/16 |
| | | | | 248/277.1 |
| 2,980,165 | A * | 4/1961 | Stine | A61G 5/10 |
| | | | | 108/6 |
| 3,353,866 | A * | 11/1967 | Chapman | A47C 7/70 |
| | | | | 297/160 |
| 4,697,778 | A * | 10/1987 | Harashima | A47B 11/00 |
| | | | | 108/103 |
| 5,547,247 | A * | 8/1996 | Dixon | A47C 7/70 |
| | | | | 297/145 |

(Continued)

*Primary Examiner* — Jose V Chen
(74) *Attorney, Agent, or Firm* — Clements Bernard Walker PLLC

(57) ABSTRACT

A tray table configured to transition between a stowed position within a stowage module to a deployed position outside of the stowage module by way of an arced rail having rail heads, and a plurality of tray table wheels and stowage module wheels arranged to mesh with the rail heads. The tray table follows an arcuate path between the stowed and deployed positions and remains horizontal in all positions of the tray table.

20 Claims, 12 Drawing Sheets

(56) References Cited

U.S. PATENT DOCUMENTS

| | | | | |
|---|---|---|---|---|
| 5,582,112 | A * | 12/1996 | Huang | A47B 11/00 |
| | | | | 108/20 |
| 7,296,523 | B1 * | 11/2007 | Yoon | A47B 95/00 |
| | | | | 108/103 |
| 7,607,726 | B2 * | 10/2009 | Orlo | B60N 3/004 |
| | | | | 248/421 |
| 7,874,614 | B2 * | 1/2011 | Figueras Mitjans | A47C 7/70 |
| | | | | 297/145 |
| 8,109,566 | B2 * | 2/2012 | Koh | A47C 7/70 |
| | | | | 297/145 |
| 8,517,190 | B2 * | 8/2013 | Polizzi | A47B 46/00 |
| | | | | 108/103 |
| 8,596,206 | B2 * | 12/2013 | Legeay | B60N 3/002 |
| | | | | 108/137 |
| 9,708,066 | B2 * | 7/2017 | Thompson | B60N 3/002 |
| 9,783,303 | B2 * | 10/2017 | Gagnon | B64D 11/06 |
| 9,815,556 | B2 * | 11/2017 | Helwig | B64D 11/0638 |
| 10,023,315 | B2 * | 7/2018 | Kuyper | A47B 5/006 |
| 2013/0093221 | A1 * | 4/2013 | Ligonniere | B64D 11/06 |
| | | | | 297/173 |
| 2015/0284088 | A1 * | 10/2015 | Gow | B64D 11/0638 |
| | | | | 297/174 R |
| 2015/0284089 | A1 * | 10/2015 | Gow | B64D 11/0605 |
| | | | | 297/147 |
| 2016/0375810 | A1 * | 12/2016 | Kong | B60N 2/793 |
| | | | | 297/145 |
| 2017/0021932 | A1 * | 1/2017 | Marais | B64D 11/0638 |

* cited by examiner

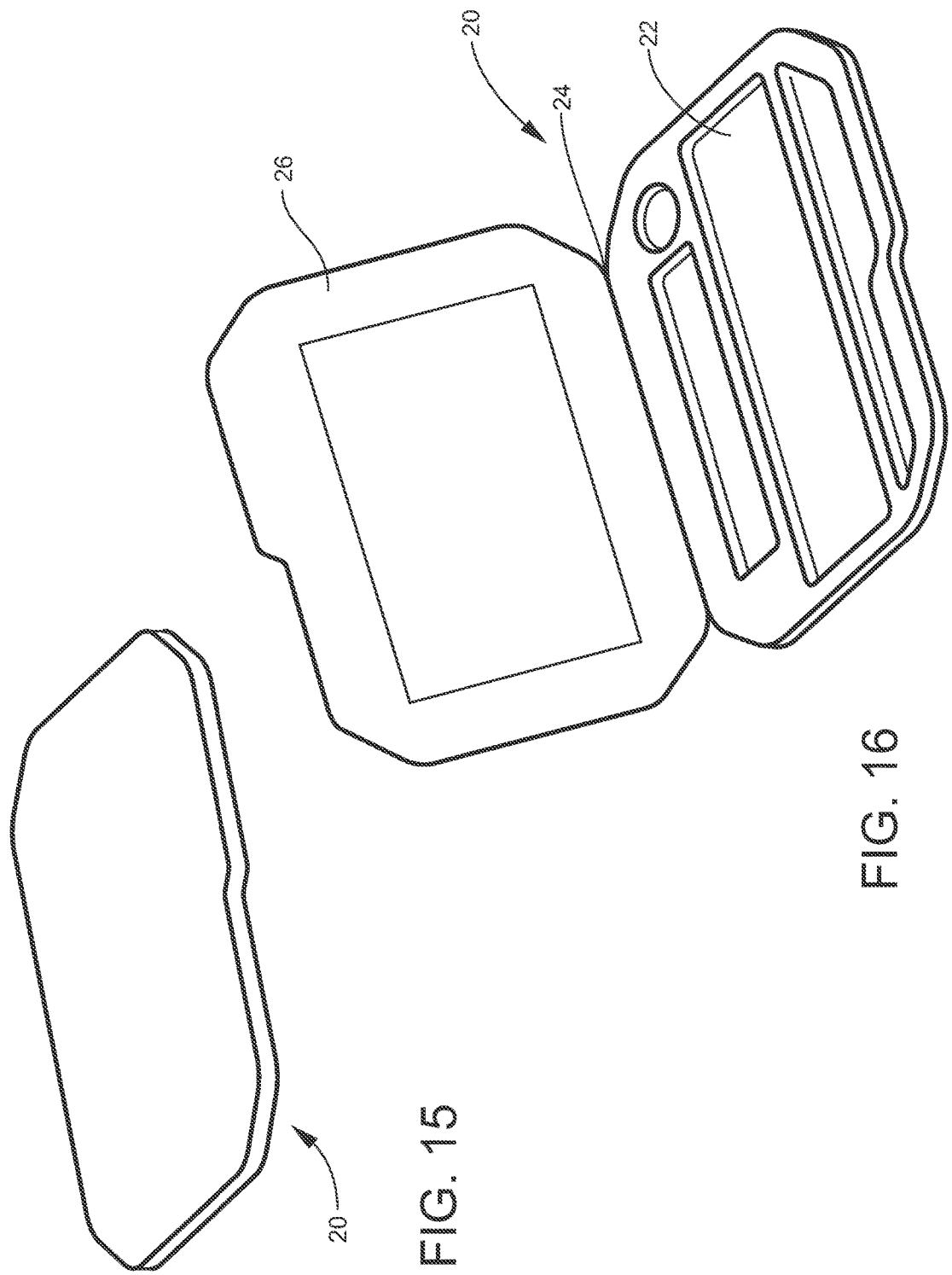

ARCED RAIL FOR AIRCRAFT TRAY TABLE

RELATED APPLICATION AND INCORPORATION BY REFERENCE

This application claims priority from U.S. Application No. 62/479,555 filed Mar. 31, 2017, the entirety of which is incorporated by reference herein.

BACKGROUND

The inventive concepts disclosed herein relate generally to the field of deployable tray tables for use aboard aircraft and other passenger conveyances, and more particularly, to a tray table deployable from within a stowage module by way of an arced rail and a plurality of wheels of the tray table and the stowage module that mesh with the rail to guide movement of the tray table along an arcuate path between the stowed and deployed positions of the tray table.

Aircraft tray tables are used for a variety of different purposes including dining, drinking, writing, reading, supporting electronics such as laptops and tablets, and as a general work surface.

Tray tables can deploy from against a seatback or from within an armrest of a passenger seat. Tray tables that deploy from a seatback can be fixed in a stowed position against the seatback and rotate downward to horizontal for use. Tray tables that deploy from within an armrest can stow perpendicular to the floor of the aircraft, perpendicular to the seatback, or parallel to an elongate arm rest.

Fold down tray tables are problematic because they depend on the availability of a fixture, such as a seatback, to be located in front of the passenger desiring to use the tray table. Thus, if there is no fixture in front of the seat or if the fixture is movable, such as is the case with a reclining seat or a lie flat seat common in first class, business class, and long haul aircraft seating, there is no suitable fixture to which a fold down tray table can be attached. Thus, there is a need for an alternative deployment assembly.

In some circumstances, tray tables can be installed perpendicularly in the armrest; however, such tray tables must be folded to be stowed and deployed, and therefore may have fold lines, hinges and other breaks which are undesirable. Also, it is common for the surface of the armrest to raise for the passenger to remove the folded tray table. Lifting the module is problematic especially where the module also functions as a side table or work surface. Thus, there is a need for a tray table that can be stowed in the armrest or elsewhere and which does not require breaks in the surface of the tray table. There is also a need for a tray table that does not require the passenger lift a portion of the armrest to deploy the tray table.

Further, tray table surface area often comes at a premium. Stowage space in aircraft is limited and, at the same time, a large tray table surface is highly desirable. Thus, there is difficulty in accommodating a large surface area of a tray table while at the same time minimizing stowage space.

SUMMARY

In one aspect, embodiments of the inventive concepts disclosed herein are directed to an aircraft tray table having a large surface area and which does not require attachment to an aircraft fixture in front of the passenger. The tray table can be configured as a unitary member devoid of a fold line, hinge or other breaks, while at the same time maximizing surface area and width relative to the passenger seat.

In one aspect, the aircraft tray table deploys from a stowed position within a passenger module to a deployed position outside of the passenger module. The tray table may include an arced rail having one or more rail heads, a plurality of tray table wheels operably connected to the aircraft tray table and meshing with the one or more rail heads, and a plurality of passenger module wheels operably connected to the passenger module and meshing with the one or more rail heads. The tray table moves or transitions in an arcuate path between the stowed and deployed positions. As used herein, the term passenger module may include an armrest, a stationary fixed work surface directly adjacent a passenger seat, a wall, or other aircraft furniture located in proximity to the passenger seat.

In another aspect, the tray table may remain in a position substantially parallel to a floor of the aircraft while stowed, deployed and while moving along the arcuate path between the stowed position and the deployed position.

In a further aspect, the plurality of tray table wheels and the plurality of passenger module wheels may have a V-groove in the surface that meshes with one or more rail heads.

In a further aspect, the rail heads may have a semi-circular shape.

In a further aspect, the rail heads may have a V-shape.

In a further aspect, parallel tabs may extend downward from a top surface of the arced rail.

In a further aspect, the one or more rail heads may include two pairs of parallel rail heads disposed on outer surfaces of the parallel tabs.

In a further aspect, the plurality of tray table wheels may be doubled stacked to mesh with the two pairs of parallel rail heads and the plurality of passenger module wheels may be doubled stacked to mesh with the two pairs of parallel rail heads.

In a further aspect, the one or more rail heads may include a first outer rail head disposed on a first outer surface of one of the outer surfaces of the parallel tabs, a second outer rail head disposed on a second outer surface of one of the outer surfaces of the parallel tabs, a first inner rail head disposed on a first inner surface of the parallel tabs, and a second inner rail head disposed on a second inner surface of the parallel tabs. The first and second outer rail heads may be positioned closer to the top surface of the arched rail than the first and second inner rail heads.

In a further aspect, the plurality of tray table wheels may mesh with first and second inner rail heads and the plurality of passenger module wheels may mesh with the first and second outer rail heads.

In a further aspect, the plurality of tray table wheels may be arranged in a first plane and the plurality passenger module wheels may be arranged in a second plane which is below the first plane relative the top surface of the rail.

In a further aspect, the plurality of passenger module wheels may be arranged in a staggered pattern and the plurality of tray table wheels may be arranged in parallel order about the arced rail.

In a further aspect, the aircraft tray table may further include a linear rail affixed to the aircraft tray table and a tray table carriage slidably attached to the linear rail and the plurality of tray table wheels. The tray table may further move in linear direction along the linear rail when the aircraft tray table is in the deployed position.

In a further aspect, the tray table may include a unitary top surface.

In a further aspect, the tray table may include an actuator that releases the tray table from the stowed position and enables a passenger to guide the tray table along the arcuate path to the deployed position.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings:

FIG. 15 is a top perspective view of a tray table; and

FIG. 16 is a top perspective view of a tray table having a hinged top.

DETAILED DESCRIPTION OF EXEMPLARY EMBODIMENTS

The inventive concepts disclosed herein are generally directed to an assembly for guiding a tray table, such as a business or premium class tray table, between stowed and deployed positions of the tray table. The assembly utilizes an arced rail that allows the tray table, once released from a stowed position, to be guided from a stowed position alongside the seated passenger to a deployed position forward of the seated passenger, and back again. The arced rail utilizes double V-grooved wheels to constrain motion, mounted both to the fixed tray table module and also to a carriage affixed to the bottom of the tray table.

Figure 1:
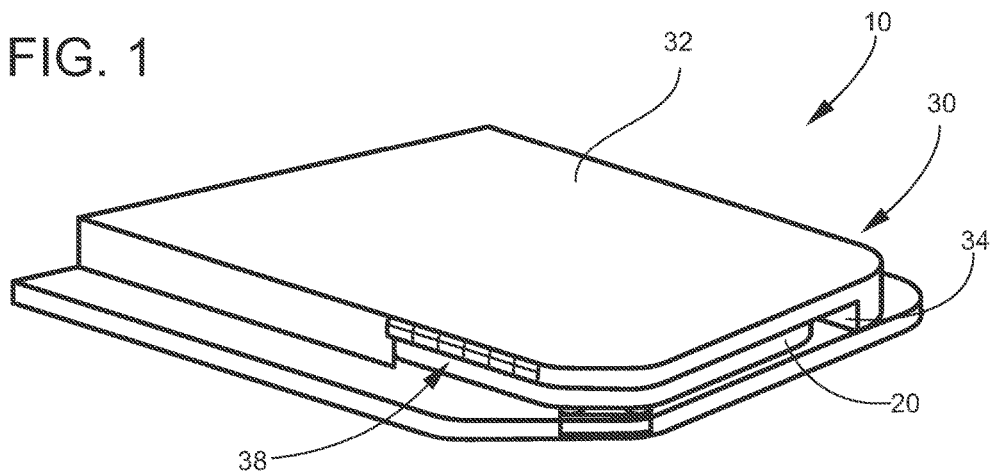
FIG. 1 is a perspective view of a stowage module and tray table assembly according to an embodiment of the invention.
Figure 2:
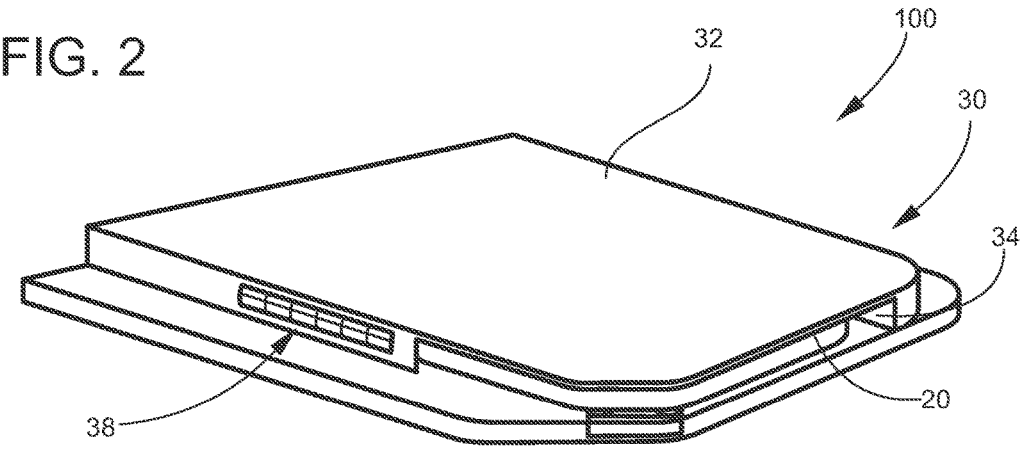
FIG. 2 is a perspective view of a stowage module and deployable tray table utilizing a stacked roller arrangement.

Referring to FIGS. 1 and 2, the tray table assembly 10, 100 generally includes a passenger module 30 that houses a tray table 20 in a stowed position of the tray table. The passenger module 30, also referred to herein as a "stowage module" or "module," may have a planar top 32 that may be used as a side table adjacent or proximate to a passenger sheet. A cavity opening 34 allows the tray table 20 to enter and exit the passenger module as the tray table 20 moves from the fully stowed position shown in FIGS. 1-3, to the fully deployed position shown in FIGS. 4-6. The module 30 may have a bank of buttons 38 or actuators, wherein actuation of one of the buttons 38 may release the tray table 20 from the fully stowed position.

Figure 8:
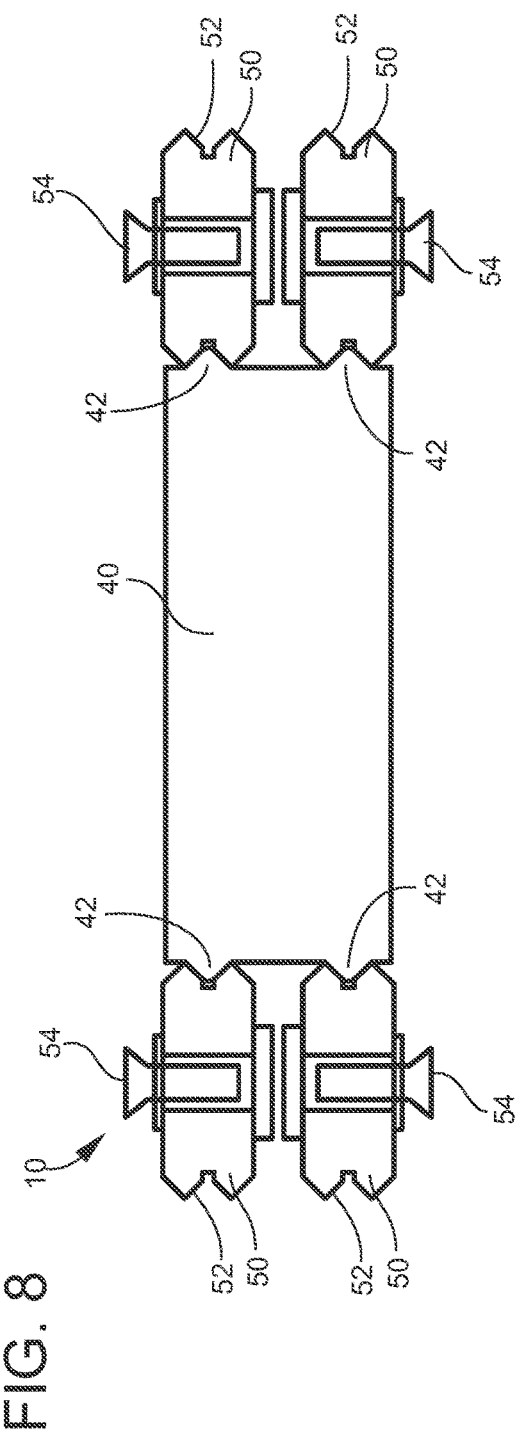
FIG. 8 is a side cutaway view of a tray table deployed utilizing double stacked rollers.
Figure 9:
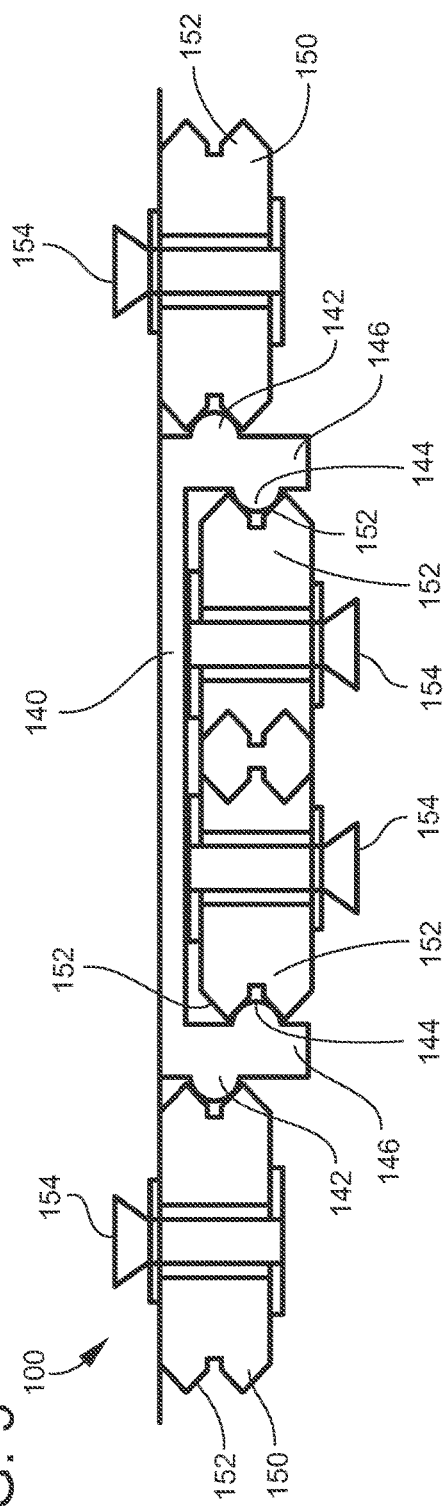
FIG. 9 is a side cutaway view of a tray table deployed utilizing Z-stacked rollers.

The embodiments 10, 100 shown in FIGS. 1 and 2 differ in the positioning of rollers 50, 150 about the arced rail 40, 140, and in the configuration of the arced rail 40, 140. Generally, FIGS. 1, 3, 4, 6, 8 and 12 show embodiments of the assembly 10 where the rollers 50 are arranged in a double stacked pattern. The double stacked arrangement of rollers 50 is best shown in FIG. 8 where the rollers 50 mesh with rail heads 42 of the arced rail 40 at a V-groove 52. Similarly, FIGS. 2, 5, 7, 9, 10 and 11 generally show embodiments of the assembly 100 where the rollers 150 are arranged in a Z-stacked arrangement. The Z-stacked arrangement of rollers 150 is best shown in FIG. 9 where the rollers 150 mesh with the upper rail head 142 at a V-groove 152, and also with a lower rail head 144 at another V-groove 152.

Figure 3:
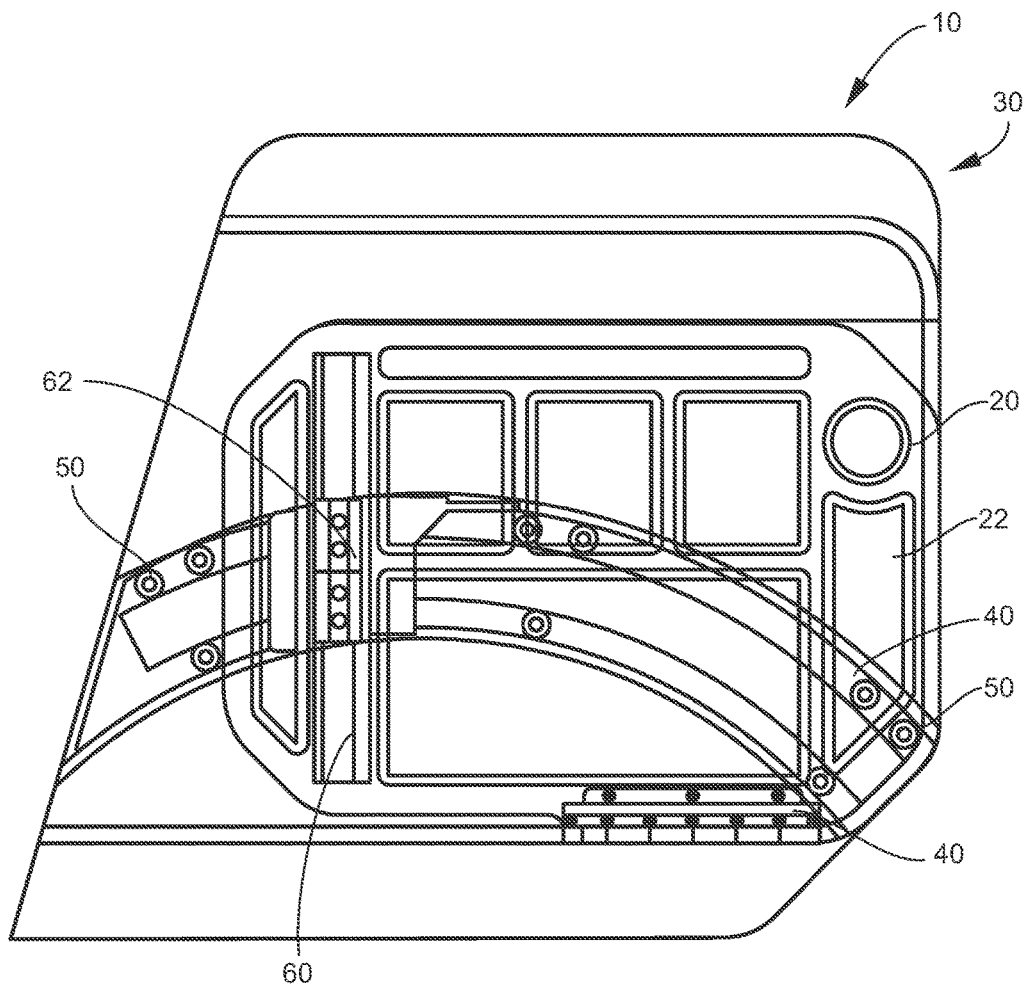
FIG. 3 is a bottom cutaway view of a deployable tray table utilizing double stacked rollers.

Referring to FIG. 3, the tray table 20 is contained in the passenger module 30 when the tray table 20 is fully stowed. The tray table 20 has a surface 22. The arced rail 50 is also contained in the passenger module 30 when the tray table 20 is fully stowed. The rollers 50 are also contained in the passenger module 30 when the tray table 20 is fully stowed. Likewise, the linear rail 60 and tray table carriage 62 are also fully contained in the passenger module 30 when the tray table 20 is fully stowed.

Figure 4:
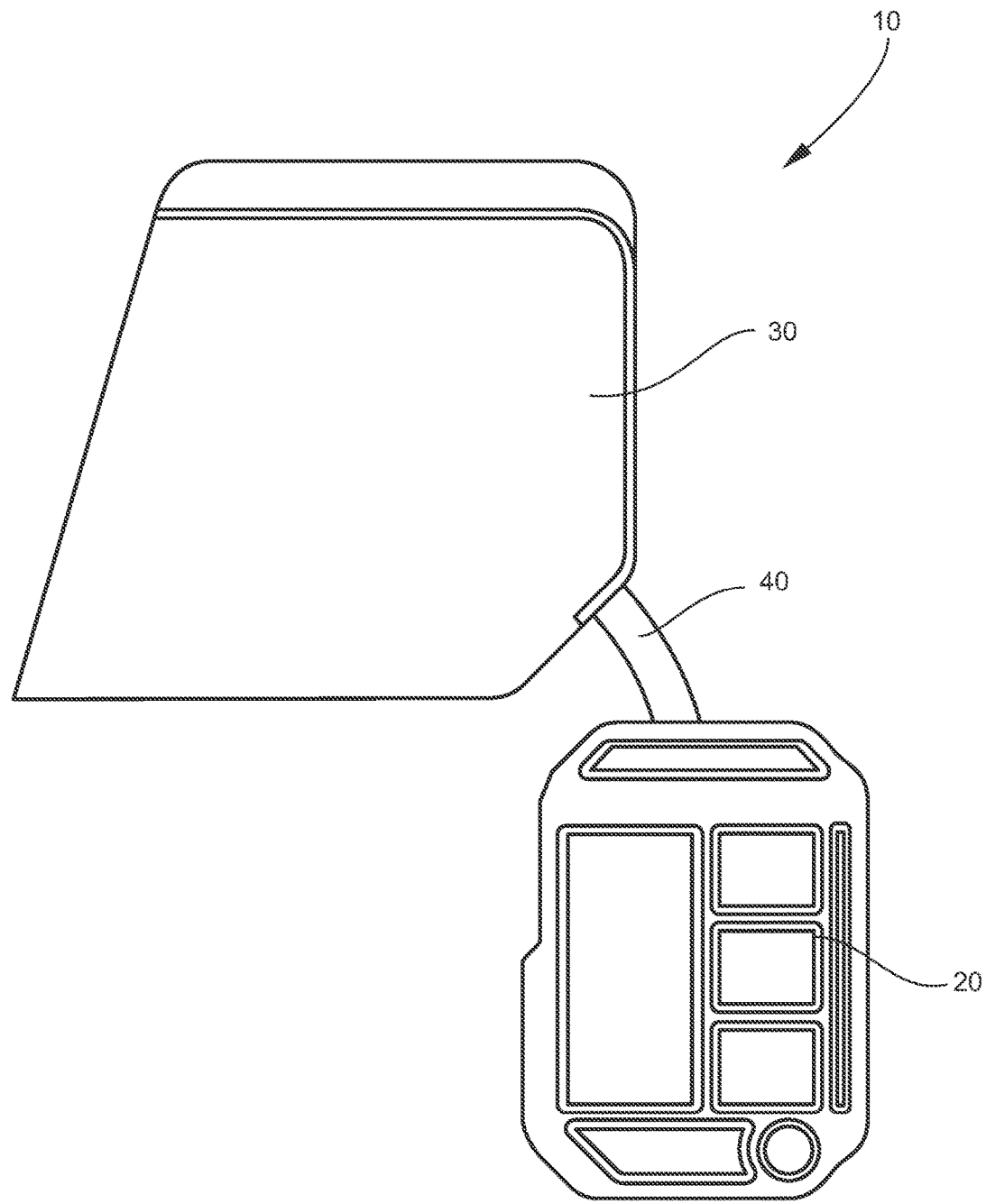
FIG. 4 a top view of a tray table shown in a deployed position.

Referring to FIG. 4, the tray table 20 moves or transitions between the stowed position shown in FIGS. 1, 2 and 3 and the deployed position shown in FIG. 4. The movement between the stowed and deployed positions occurs via arcuate movement of the arced rail 40.

Figure 5:
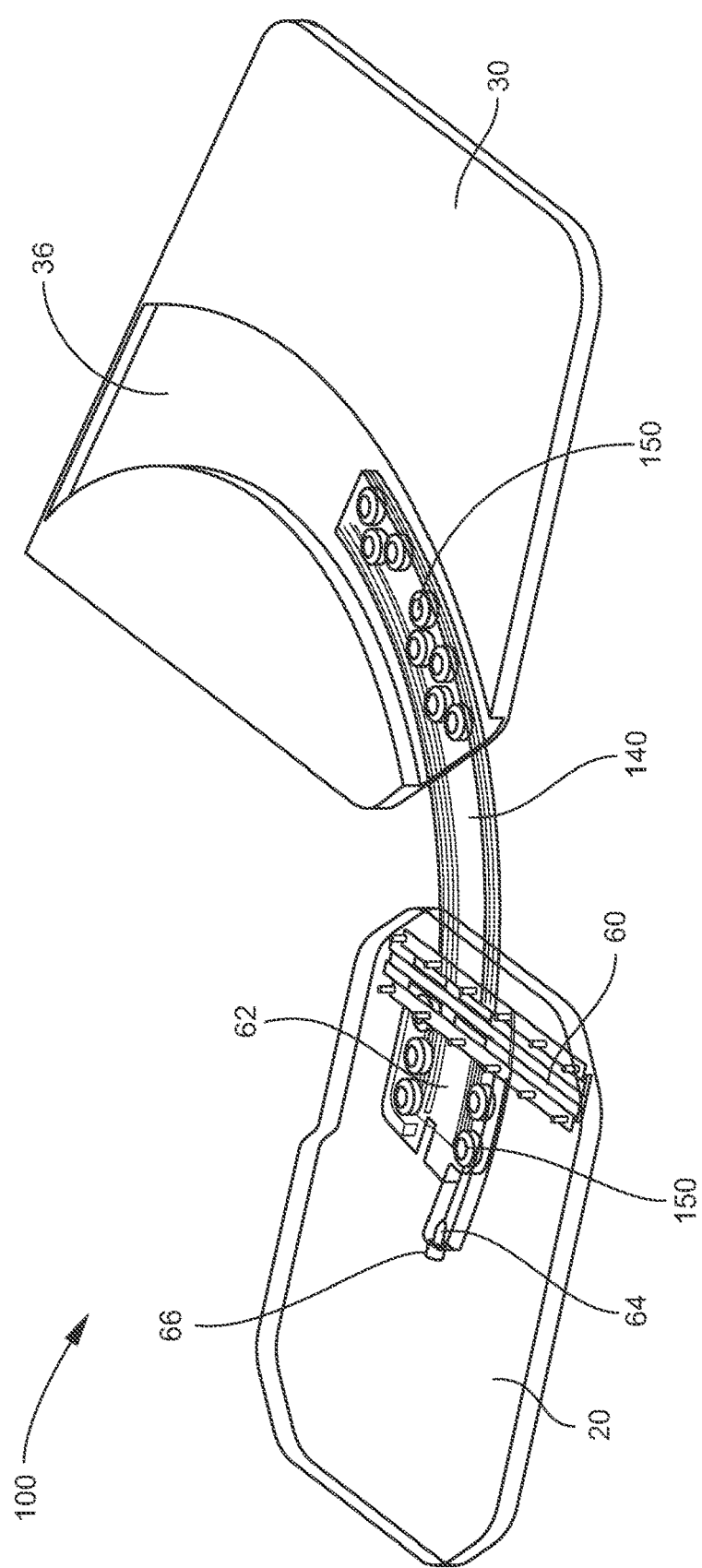
FIG. 5 is a bottom perspective cutaway view of a deployable tray table assembly utilizing Z-stacked rollers.

Referring to FIG. 5, the arced rail 140 is coupled to the module 30 and resides within and translate relative to a 36 of the module 30. A first set of the rollers 150 are rotatably mounted to the passenger module 30 and mesh with the arced rail 140 to guide and constrain movement thereof. The linear rail 60 is embedded in the tray table 20. The tray table carriage 62 slidably engages the linear rail 60. A separate second set of rollers 150 are rotatably mounted to the tray table carriage 62 and mesh with the arced rail 140. A tray table support member 64 extends from the tray table carriage 62, and a cam follower 66 is affixed to a distal end of the tray table support member 64. The cam follower 66 provides additional support to the tray table 20 as the tray table travels along the linear rail 60, and also as the tray table travels along the arcuate path about the arced rail 140. The cam follower 66 may rotate about an axis defined by the direction of the tray table support member 64.

Figure 6:
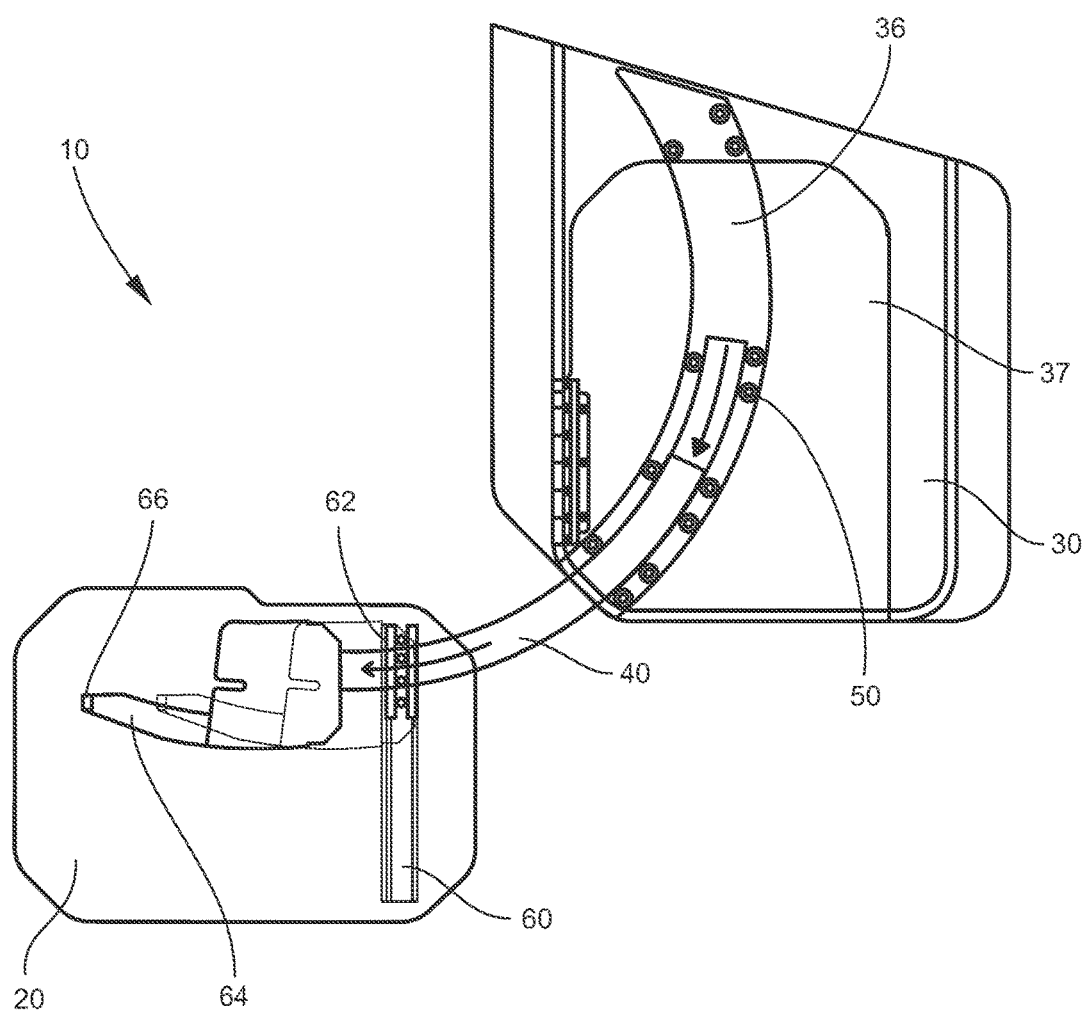
FIG. 6 is a bottom cutaway view of a tray table shown deployed utilizing double stacked rollers.

Referring to FIG. 6, the passenger module 30 defines a cavity 36 that houses the arced rail 140. A tray table cavity 37 is provided in the passenger module 30 which houses the tray table 20 when fully stowed. A first set of the rollers 50 are rotatably mounted to the passenger module 30 and mesh with the arced rail 40. A linear rail 60 is embedded in tray table 20, and a tray table carriage 62 slidably engages the linear rail 60. A second set of rollers are rotatably mounted to the tray table carriage 62 and mesh with the arced rail 40. A tray table support member 64 extends from the tray table carriage 62, and a cam follower 66 is affixed to a distal end of the tray table support member 64. The cam follower 66 provides additional support to the tray table 20 as the tray table travels along the linear rail 60 and also as the tray table moves in the arcuate path about the arced rail 40. The cam follower 66 may rotate about an axis defined by the direction of the tray table support member 64.

Figure 7:
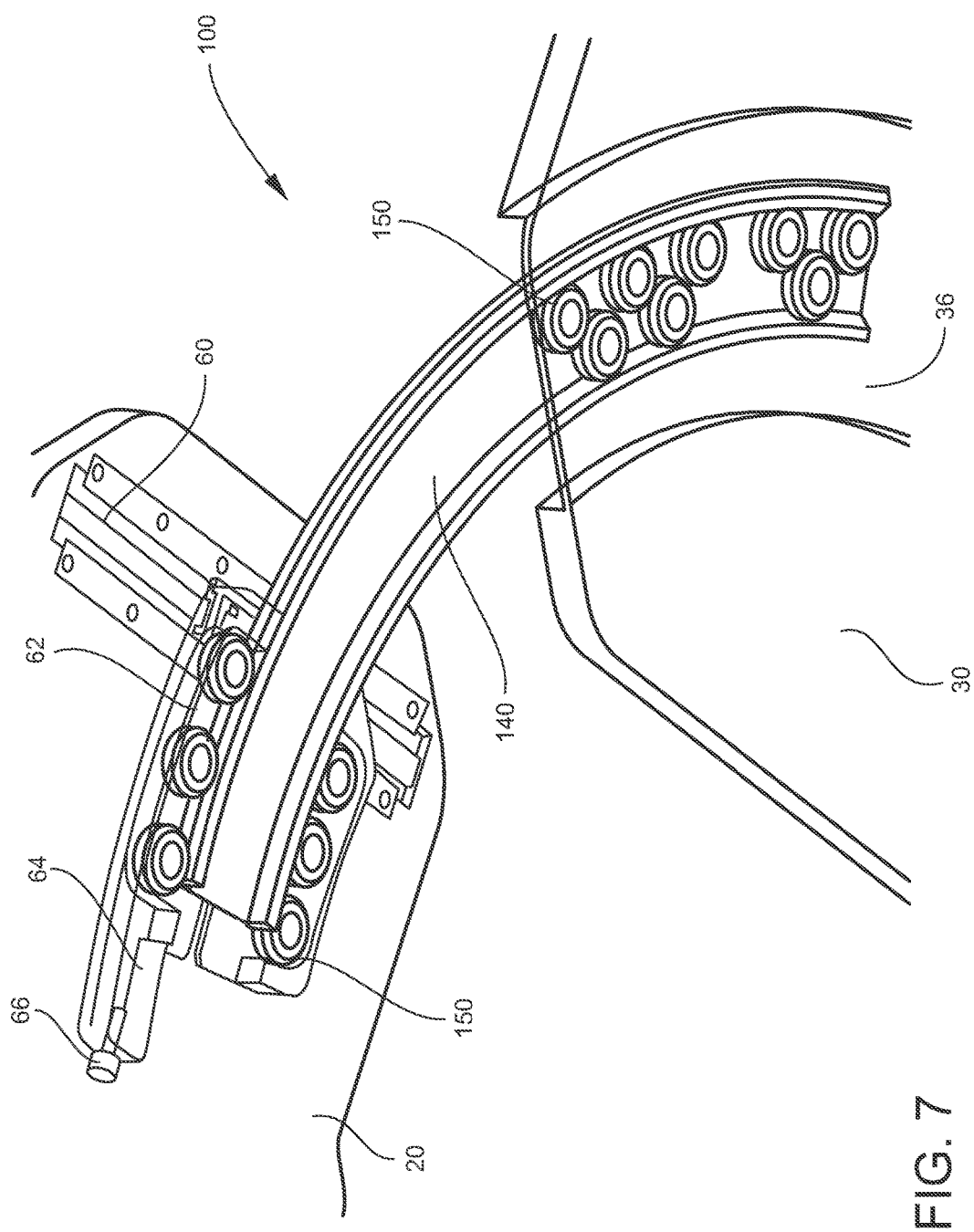
FIG. 7 is a bottom partial cutaway view showing the tray table deployed utilizing Z-stacked rollers.

Referring to FIG. 7, the passenger module 30 is coupled to the arced rail 140 via a set V-grooved wheels 150 that mesh with rail heads disposed on an interior surface of the arced rail 140. The wheels 150, which are rotatably mounted to the passenger module 30, are arranged in a staggered pattern along an interior length of the arced rail 140. The V-groove wheels 150 may be rotatably mounted to a post or axle oriented perpendicular to a horizontal surface of passenger module 30.

The linear rail 60 is embedded within or affixed to the tray table 20. The tray table carriage 62 slidably engages the linear rail 60 such that the tray table 20 may move in a linear direction about the linear rail 60. A second set of V-grooved wheels 150 are affixed to the tray table carriage 62. The second set of wheels 150 are disposed outside of the radius of the arced rail 140 and may be arranged parallel to each other as shown. The tray table carriage 62 may also include a support member 64 extending in a longitudinal direction away from the carriage 62, and a cam follower 66 may be disposed at a distal end of the support member 64 arranged to contact a bottom surface of the tray table 20. The cam follower 66 may rotate and support the weight of the tray table 20. The tray table moves smoothly from the stowed position to the deployed position in an arcuate path such that the tray table 20 moves from a stowed position adjacent and parallel to a passenger seat to a deployed position directly in front of and perpendicular to the passenger seat. Once deployed in front of the passenger seat, the tray table 20 may translate in a linear direction either closer to or farther apart from the seated passenger.

Referring to FIGS. 8 and 9, the two primary embodiments 10, 100 of the V-grooved wheels and arced rail 40, 140 are shown. Referring to FIG. 8, the V-grooved wheels 50 are double stacked on opposing sides of the arced rail 40. Each V-grooved wheel 50 has a V-groove 52 that meshes with the rail head 42. Each wheel is rotatably mounted on an axle 54. Referring to FIG. 9, the V-grooved wheels 150 can have a Z-stack arrangement. The arced rail 140 of FIG. 9 has both outer rail heads 142 and inner rail heads 144. The outer rail heads 142 are disposed along an upper portion of an outer surface of the arced rail 140. The inner rail heads 144 are disposed along an inner portion of the outer surface of the arced rail 140. Axles 154 can serve to rptatbly mounted the wheels 150.

Figure 10:
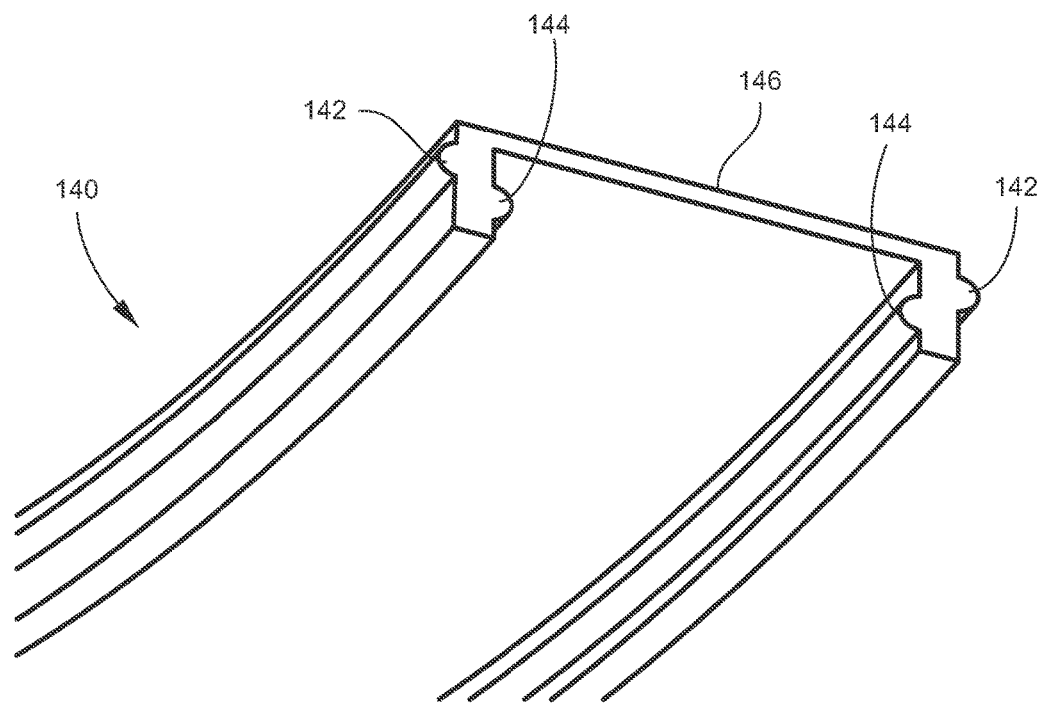
FIG. 10 is a perspective view of a portion of an arced rail.

Referring to FIG. 10, the profile of the arced rail 140 is shown, and specifically, the displacement of the outer rail heads 142 and the inner rail heads 144. The outer rail heads 142 are disposed proximate the flat surface 146 of the arced rail 140. The inner rail heads 144 are disposed apart from the flat surface 146 of the arced rail 140. The inner and outer rail heads 142, 144 run substantially the entire length of the arced rail 140.

Figure 11:
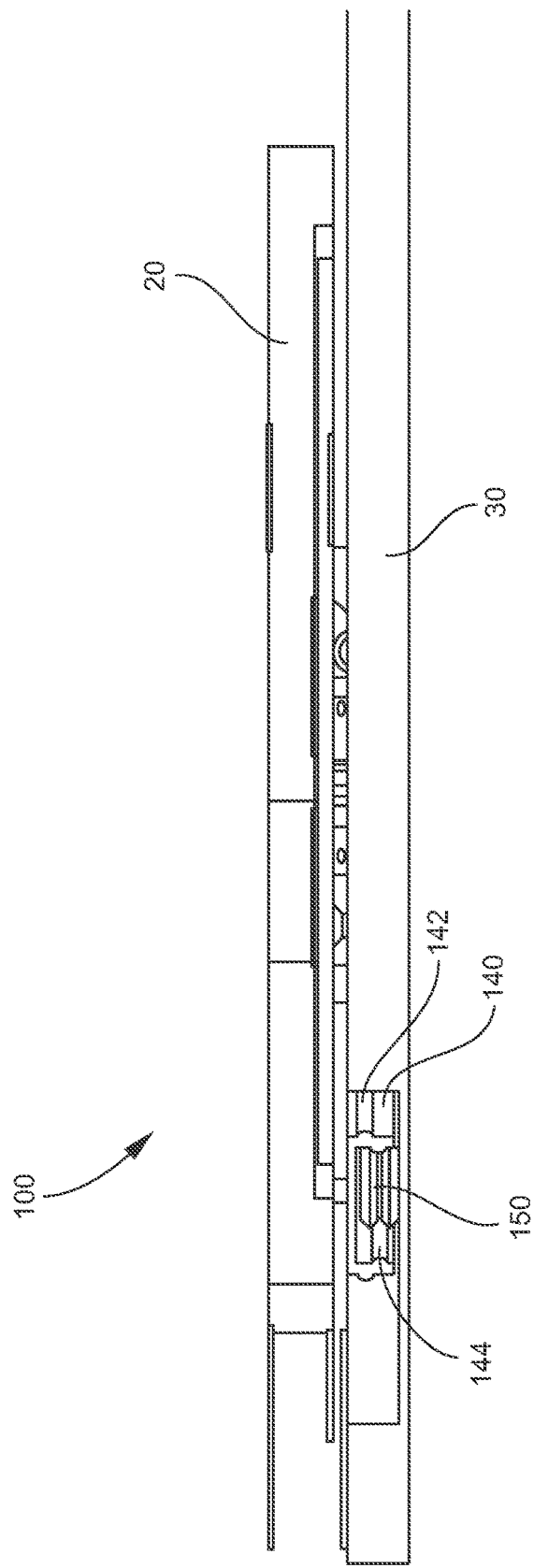
FIG. 11 is a side elevation view of a deployable tray table deployed utilizing Z-stacked rollers.

Referring to FIG. 11, the side profile of the partially assembled assembly 100 is shown in the stowed position. The arced rail 140 is disposed in the cavity of the passenger module 30, as are wheels 150 and inner and outer rail heads 142, 144. The Z-stack arrangement of the wheels 150 of the assembly 100 provides a thin overall vertical profile.

Figure 12:
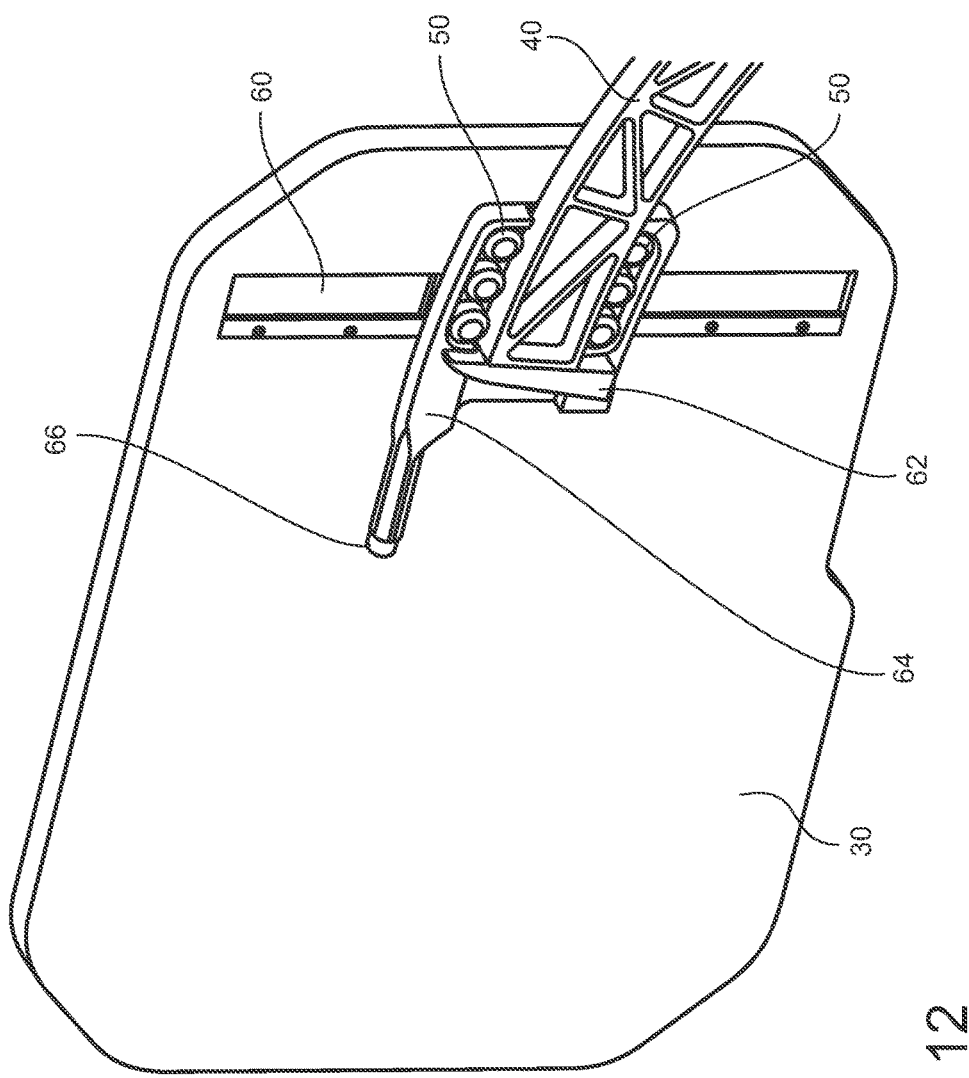
FIG. 12 is a partial perspective view of a tray table assembly utilizing double stacked rollers.
Figure 14:
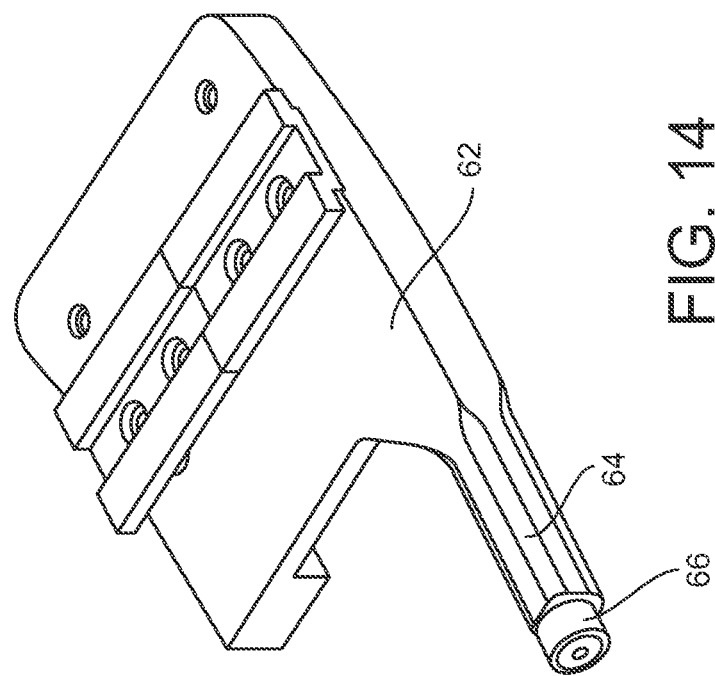
FIG. 14 is a perspective view of a carriage for use with the linear rail of FIG. 13.
Figure 13:
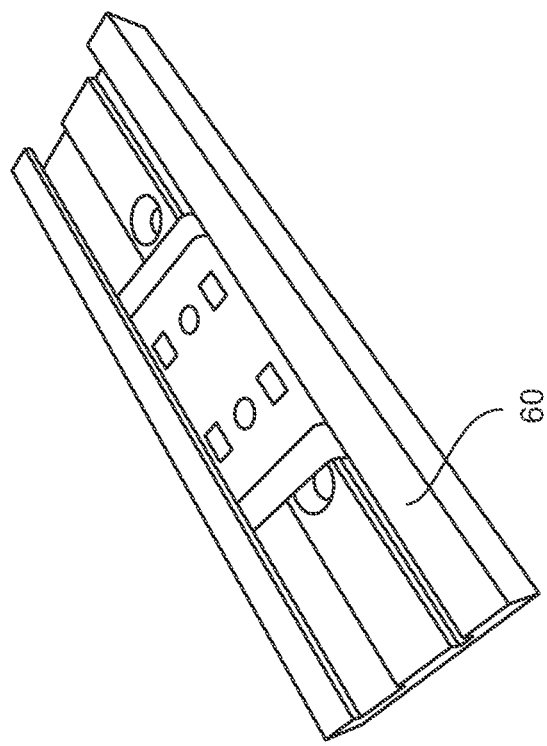
FIG. 13 is a perspective view of a linear rail.

The linear movement component of the assembly 10 is shown in FIGS. 12, 13 and 14. The linear rail 60 is affixed to or embedded in the underside of the tray table 20. The tray table carriage 62 engages the linear rail 60 and slides along the linear rail. The tray table carriage 62 may be configured with a support member 64 and a cam follower 66.

Referring to FIGS. 15 and 16, the tray table 20 can be configured with a hinged top 26 for providing access to an underlying storage area 22. The hinge 24 may be disposed between the hinged top surface 26 and the storage area 22, or behind the top such that the hinge 24 is concealed from view from above.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A tray table assembly, comprising:
a stowage module;
a tray table configured to transition along an arcuate path between a stowed position within the stowage module and a deployed position outside of the stowage module;
an arced rail having a first tab, a second tab parallel to the first tab, a first rail head extending from the first tab, and a second rail head extending from the second tab;
a plurality of tray table wheels rotatably mounted to the tray table and engaging at least the first rail head; and
a plurality of stowage module wheels rotatably mounted to the stowage module and engaging at least the second rail head.

2. The tray table assembly of claim 1, wherein the tray table remains horizontal in each of the stowed position, the deployed position, and intermediate positions as the tray table transitions along the arcuate path between the stowed and deployed positions of the tray table.

3. The tray table assembly of claim 1, wherein each of the plurality of tray table wheels has a groove that engages the first rail head, and each of the stowage module wheels has a groove that engages the second rail head.

4. The tray table assembly of claim 1, wherein the first rail head has a semi-circular shape.

5. The tray table assembly of claim 1, wherein the first rail head has a V-shape.

6. The tray table assembly of claim 1, further comprising a third rail head extending from the first tab, and a fourth rail head extending from the second tab.

7. The tray table assembly of claim 6, wherein the plurality of tray table wheels are provided in a doubled stacked configuration to mesh with the first rail head and third rail head, and wherein the plurality of stowage module wheels are provided in a doubled stacked configuration to mesh with the second rail head and fourth rail head.

8. The tray table assembly of claim 6, wherein
the first rail head is disposed along an outer surface of the first tab;
the third rail head is disposed along an inner surface of the first tab opposite the inner surface of the first tab;
the second rail head is disposed along an inner surface of the second tab; and
the fourth rail head is disposed along an outer surface of the second tab opposite the inner surface of the second tab.

9. The tray table assembly of claim 8, wherein the plurality of tray table wheels mesh with the first and the fourth rail heads, and wherein the plurality of stowage module wheels mesh with the second and third rail heads.

10. The tray table assembly of claim 9, wherein the plurality of tray table wheels are arranged in a first plane and the plurality of stowage module wheels are arranged in a second plane disposed below the first plane relative to the top surface of the arced rail.

11. The tray table assembly of claim 10, wherein the plurality of stowage module wheels are arranged in a staggered pattern, and wherein the plurality of tray table wheels are arranged in a parallel pattern about the arced rail.

12. The tray table assembly of claim 1, further comprising:
   a linear rail affixed to an underside of the tray table; and
   a tray table carriage slidable along the linear rail and affixed to the plurality of tray table wheels;
   wherein the tray table is configured to translate along the linear rail.

13. A tray table assembly, comprising:
   a stowage module;
   a tray table configured to transition along an arcuate path between a stowed position within the stowage module and a deployed position outside of the stowage module;
   an arced rail comprising a first outer rail head disposed along a first outer surface of the arced rail, a second outer rail head disposed along a second outer surface of the arced rail, a first inner rail head disposed along a first inner surface of the arced rail, and a second inner rail head disposed along a second inner surface of the arced rail;
   a plurality of tray table wheels rotatably mounted to the tray table and engaging the first and second inner rail heads; and
   a plurality of stowage module wheels rotatably mounted to the stowage module and engaging the first and second outer rail heads.

14. The tray table assembly of claim 13, wherein the tray table remains horizontal in each of the stowed position, the deployed position, and intermediate positions as the tray table transitions along the arcuate path between the stowed and deployed positions of the tray table.

15. The tray table assembly of claim 13, wherein each of the plurality of tray table wheels and the stowage module wheels has a V-groove defined in a surface thereof.

16. The tray table assembly of claim 13, wherein the plurality of tray table wheels are arranged in a first plane and the plurality of stowage module wheels are arranged in a second plane disposed below the first plane relative to a top surface of the arced rail.

17. The tray table assembly of claim 13, wherein the plurality of stowage module wheels are arranged in a staggered pattern and the plurality of tray table wheels are arranged in a parallel pattern about the arced rail.

18. The tray table assembly of claim 13, further comprising:
   a linear rail affixed to an underside of the tray table; and
   a tray table carriage slidable along the linear rail and affixed to the plurality of tray table wheels;
   wherein the tray table is configured to translate along the linear rail.

19. The tray table assembly of claim 18, wherein the tray table translates along the linear rail in the deployed position of the tray table.

20. A tray table assembly, comprising:
   a stowage module;
   a tray table configured to transition along an arcuate path between a stowed position within the stowage module and a deployed position outside of the stowage module;
   an arced rail having a first tab, a second tab parallel to the first tab, a first rail head extending from the first tab, and a second rail head extending from the second tab;
   a plurality of tray table wheels rotatably mounted to the tray table and engaging at least the first rail head;
   a plurality of stowage module wheels rotatably mounted to the stowage module and engaging at least the second rail head;
   a linear rail affixed to an underside of the tray table; and
   a tray table carriage slidable along the linear rail and affixed to the plurality of tray table wheels, wherein the tray table is configured to translate along the linear rail.

* * * * *